(12) United States Patent
Cholas (10) Patent No.: US 9,641,890 B2
(45) Date of Patent: May 2, 2017

(54) MEDIA SERVICES TRANSPORT FORMAT CONVERTER

(75) Inventor: Chris A. Cholas, Frederick, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 578 days.

(21) Appl. No.: 13/461,520

(22) Filed: May 1, 2012

(65) Prior Publication Data

US 2013/0294527 A1 Nov. 7, 2013

(51) Int. Cl.
| | |
|---|---|
| *H04N 7/12* | (2006.01) |
| *H04N 7/26* | (2006.01) |
| *H04N 21/4363* | (2011.01) |
| *H04N 21/4402* | (2011.01) |
| *H04N 21/647* | (2011.01) |
| *H04N 19/00* | (2014.01) |
| *H04N 21/61* | (2011.01) |
| *H04N 21/6408* | (2011.01) |

(52) U.S. Cl.
CPC . *H04N 21/4363* (2013.01); *H04N 21/440218* (2013.01); *H04N 21/64707* (2013.01); *H04N 19/00* (2013.01); *H04N 21/6112* (2013.01); *H04N 21/6408* (2013.01)

(58) Field of Classification Search
CPC .. H04N 7/50; H04N 7/26941; H04N 21/2365; H04N 21/4347; H04N 21/23608
USPC .................................................... 375/240.26
See application file for complete search history.

(56) References Cited

U.S. PATENT DOCUMENTS

| | | | |
|---|---|---|---|
| 2003/0220100 A1* | 11/2003 | McElhatten .......... G06F 3/0482 455/418 |
| 2007/0088675 A1* | 4/2007 | Duncan ............................. 707/2 |
| 2007/0237090 A1* | 10/2007 | Kim .................... H04L 12/2803 370/252 |
| 2007/0242701 A1* | 10/2007 | Lee et al. ...................... 370/487 |
| 2008/0127277 A1* | 5/2008 | Kuschak ......................... 725/74 |
| 2008/0313691 A1* | 12/2008 | Cholas et al. ................ 725/131 |

* cited by examiner

*Primary Examiner* — Gims Philippe
*Assistant Examiner* — On S Mung
(74) *Attorney, Agent, or Firm* — Chapin IP Law, LLC (57) ABSTRACT

An ATSC to DLNA converter receives ATSC signals in an RF broadcast format for conversion to a DLNA packet format for rendering on a DLNA device in response to a subscriber request. The RF (ATSC) to packet (DLNA) converter receives transmissions in a broadcast medium having a format deliverable to a nonselective recipient set based on a broadcast range, and allows selective tuning and redirection to specific recipients via a network identifier. The RF medium is an over the air transmission receivable by a plurality of antennas within range, and the resulting media stream is directed to specific requesting subscribers based on an IP address or other network identifier. A channel mapping between the broadcast medium and the packet based media stream allows a user media selection by identifying desired content via a channel or menu selection, and a broadcast-to-packet conversion encapsulates the media stream payload for a specific recipient.

20 Claims, 7 Drawing Sheets

MEDIA SERVICES TRANSPORT FORMAT CONVERTER

BACKGROUND

Broadcast mediums have continually evolved to transmit various types of information to a group of recipients. Conventional broadcasts of "over the air" TV signals have been overtaken by cable TV and, in recent decades, further surpassed by digital cable and so-called "broadband services" as the wired infrastructure evolved to handle ever increasing bandwidth in a digital format. Coaxial cable networks carrying analog RF signals have been generally superceded by so-called Hybrid Fiber-Coax (HFC) networks, which apply a digital infrastructure and fiber optic trunks to deliver substantially more bandwidth over the same coax cable (e.g. RG6) to a residence once used for carrying analog TV (cable) signals.

Television broadcasts, once referred to as a "radio picture", have evolved towards a physical wired transport medium, in contrast to telephones which have evolved from wired to predominantly wireless. Nonetheless, the industry has not abandoned over-the-air broadcasts so as to not render deployed television equipment completely obsolete. However, in recent years the FCC (Federal Communications Commission) has recognized the predominance of digital transport mediums by converting the national NTSC television format from an analog to a digital medium, rebranded as ATSC (Advanced Television Systems Committee). Users of older analog equipment now require a specialized converter box if they wish to cling to their analog equipment.

The dominance of digital based user rendering devices (i.e. TVs and various portable renditions of similar viewable devices) has prompted many users to abandon the traditional "over the air" ATSC broadcast in favor of cable TV and broadband based services in a digital form. Nonetheless, the legacy ATSC mode of transport continues to deliver RF broadcast signals to remaining ATSC conversant devices. Until recently, over-the-air broadcasting was analog (NTSC), and therefore was infeasible for rendering on a digital based device.

SUMMARY

An RF to packet converter receives transmissions in a broadcast medium having a format deliverable to a nonselective recipient set based on a broadcast range, and allows selective tuning and redirection to specific recipients via a packet based media stream that identifies subscribers using a network identifier. The RF medium is an over-the-air transmission receivable by a plurality of antennas within range, and the resulting media stream is directed to specific requesting subscribers based on an IP address or other network identifier. A channel mapping between the broadcast medium and the packet based media stream allows a user media selection by identifying desired content via a channel or menu selection, and a broadcast-to-packet conversion encapsulates the media stream payload for a specific recipient subscriber.

In the example configurations herein, the RF to packet converter further comprises an ATSC to DLNA (Digital Living Network Alliance) converter that receives ATSC signals in a broadcast format and converts the broadcast signals to a DLNA format for rendering on a DLNA device in response to a subscriber request. The DLNA standard for digital devices (e.g. HDTVs and the like) evolved from an industry collaborative trade organization for defining interoperability between consumer devices. A converter device receives ATSC broadcast signals and a request from the subscriber for a particular program offering. The converter identifies the media stream in the received ATSC signal containing the requested media content, and repackets the media content into a DLNA packet structure including the address of the requesting subscriber, typically a DLNA conversant device at the residence of the subscriber. The device further invokes a delivery service for identifying available ATSC content, and determines a corresponding channel in the channel lineup of the DLNA recipient device.

Configurations herein are based on the observation that a DLNA medium may not always be the preferable delivery mode by a particular recipient, and that DLNA may not necessarily have all the offerings that are available on an ATSC (broadcast) medium. Unfortunately, conventional approaches for selecting multimedia delivery suffers from the shortcoming that most consumer devices are equipped to receive only an ATSC format or a DLNA format. End user equipment, often called customer premises equipment, is not capable of exploring or analyzing ATSC available programming to determine if a particular multimedia offering is available in an ATSC format, nor determine which of ATSC or DLNA is a preferable delivery mode for a particular user (recipient) of the multimedia offering.

Repacketizing the ATSC broadcast payload, which was originally intended for a plurality of recipients, to a DLNA unicast (single recipient) address encounters the difficulty of receiving the MPEG2 HD video stream and encapsulating it into an HTTP unicast IP stream. The ATSC converter as disclosed herein scans the over the air channels for the Program Specific Information broadcast in the MPEG2 transport stream for each frequency. The ATSC converter then parses all the channel information and publishes the channel specific information into the Content Directory Service (CDS). It also builds a translation map between a video URL in the CDS to the tuning parameters on the PSI stream. When a DLNA renderer or control point accesses the video URL in the CDS, the ATSC Converter's media pump tunes to the specific frequency and MPEG2 program that is mapped to that video URL. It then encapsulates all the MPEG2 content from that tuned stream, encapsulates it into IP unicast and send it to the renderer corresponding to a requesting subscriber.

Accordingly, configurations herein substantially overcome the above described shortcomings by providing an ATSC to DLNA converter that identifies and receives broadcast ATSC signals, and converts an identified media stream in the ATSC signal to a DLNA format for receipt by a requesting user having DLNA equipment (i.e. rendering device). Channel offerings and lineup are mapped between the two modes, and a user may select to receive ATSC media offerings, such as over the air ATSC broadcasts, on a DLNA conversant device.

In further detail, the method of transporting video signals as disclosed in configurations herein includes receiving a media signal in an RF format, such that the RF format is delivered to a nonselective recipient set based on a broadcast range, and identifying a digital transport format corresponding to a subscriber. A packet converter (converter) identifies, using a directory service, a codec for converting the received media signal to the identified digital transport format, and converts the received media signal into the digital transport format using the identified codec.

Alternate configurations of the invention include a multiprogramming or multiprocessing computerized device such as a multiprocessor, controller or dedicated computing device in either a handheld, mobile, or desktop form or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The advent of HDTV and digital transmission formats brings a need to standardize evolving digital formats promulgated by the various industry vendors. A standard known as DLNA (Digital Living Network Alliance) evolved from an industry effort to standardize transmission mediums to various rendering devices available from digital equipment vendors. Accordingly, as with most industry promulgated standards, devices conversant in the standard should be compatible with other devices also adhering to the standard.

Conventional TV technology is based on analog signals broadcast over the air, and for decades was based on standards promulgated by the NTSC (National Television System Committee). The NTSC spec was created in 1946, updated for color in 1953, and updated for stereo in 1984. Both of these updates were backward compatible, maintaining backward compatibility with existing units. On Jun. 12, 2009, the NTSC Standard was been replaced by the ATSC Digital TV Standard. This new digital standard has little in common with NTSC other than the 6 megahertz channel width.

ATSC (Advanced Television Systems Committee) is therefore the standard that defines the digital TV (DTV) that the FCC has chosen for terrestrial TV stations. ATSC employs MPEG-2, a data compression standard. MPEG-2 typically achieves a 50-to-1 reduction in data. It achieves this efficiency by not retransmitting areas of the screen that have not changed since the previous frame.

The DLNA media format model is intended to achieve a baseline for network interoperability while encouraging continued innovation in media codec technology. Improvements in media codec technology result in better network bandwidth utilization and media quality for a given bit rate. DLNA requirements on media format support apply to media content that passes over the home network from a DMS or M-DMS device to a DMP or M-DMP device. The DLNA media format model defines a set of required media formats and a set of optional media formats for both device categories and for each of the three classes of media: image, audio, and video with audio (AV).

The configurations that follow illustrate examples utilizing the ATSC to DLNA converter for receiving ATSC over-the-air signals and converting the ATSC signals to a DLNA signal responsive to a user request. Such configurations are illustrative and additional applications of the disclosed techniques may be apparent to those of skill in the art.

Figure 1:
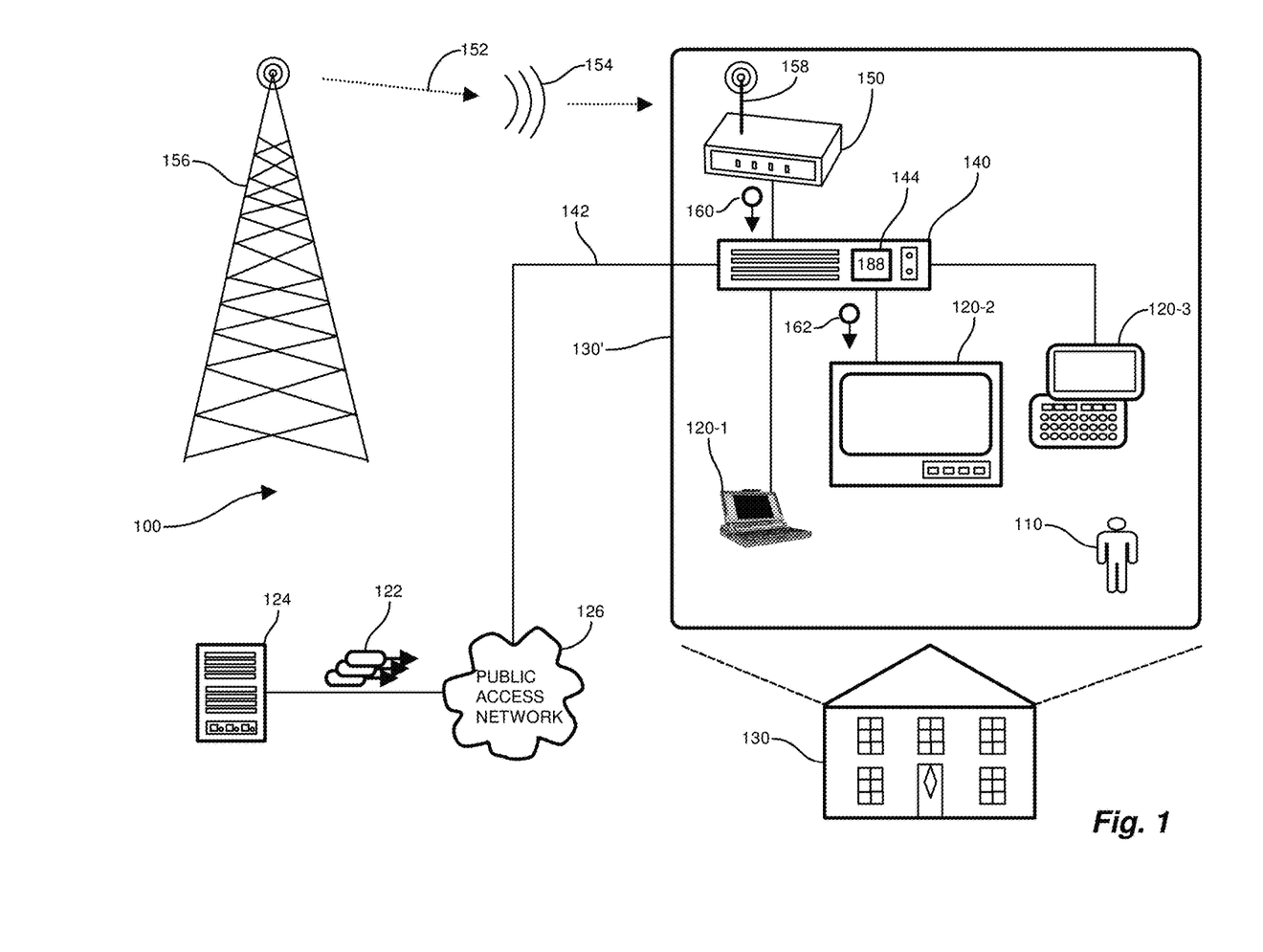
FIG. 1 is a context diagram of a media services environment suitable for use with configurations herein.

FIG. 1 is a context diagram of a media services environment suitable for use with configurations herein. Referring to FIG. 1, in the media service environment 100, a subscriber 110 or user receives media services via rendering devices 120-1 . . . 120-3 (120 generally), including free standing TVs, laptops and other mobile devices, typically as a stream of packets 122 from a service provider 124 such as a headend or central office over a public access network 126 such as the Internet. The public access network 126 typically connects to the home or dwelling 130 of the subscriber 110 via a converter box 140 or tuner, often referred to as a "settop" box due to proximity to a conventional TV set. The settop box 140 receives the media services by any suitable connection 142, typically a coax cable or fiber optic line entering the dwelling 130' for providing all rendering devices 120 therewithin. One or more settop boxes 140 at the dwelling is each operable for selection of channels 144 containing particular media content sought by the user, typically corresponding to a stream of media 122 on a predetermined bandwidth range corresponding to the channel 144. Thus, the dwelling connection 142 transports a plurality of media streams 122 corresponding to different channels 144 selectable by settops 140 or other tuning devices (such as digital tuning TVs 120-2) capable of identifying and decoding a packet structure of the incoming stream of packets 122.

Configurations herein provide a packet converter 150 for receiving legacy television signals, such as over the air ATSC signals, and converting to a media stream 122 for rendering on the rendering devices 120. In the example arrangement, an air transport medium 152 carries broadcast signals 154 from a transmitter 156 for receipt by a plurality of antennas 158 within a broadcast range. In the example arrangement, the broadcast signals are ATSC signals adapted for receipt with conventional aerial antennas, common prior to widespread coverage of cable TV services. In configurations herein the converter 150 receives the broadcast signals 152, converts them from a broadcast to unicast medium such as DLNA, identifies the DLNA recipient device 120, and transports the resulting media stream 162 as a rendering signal on a channel recognized by the rendering device 120 for the subscriber 110.

Figure 2:
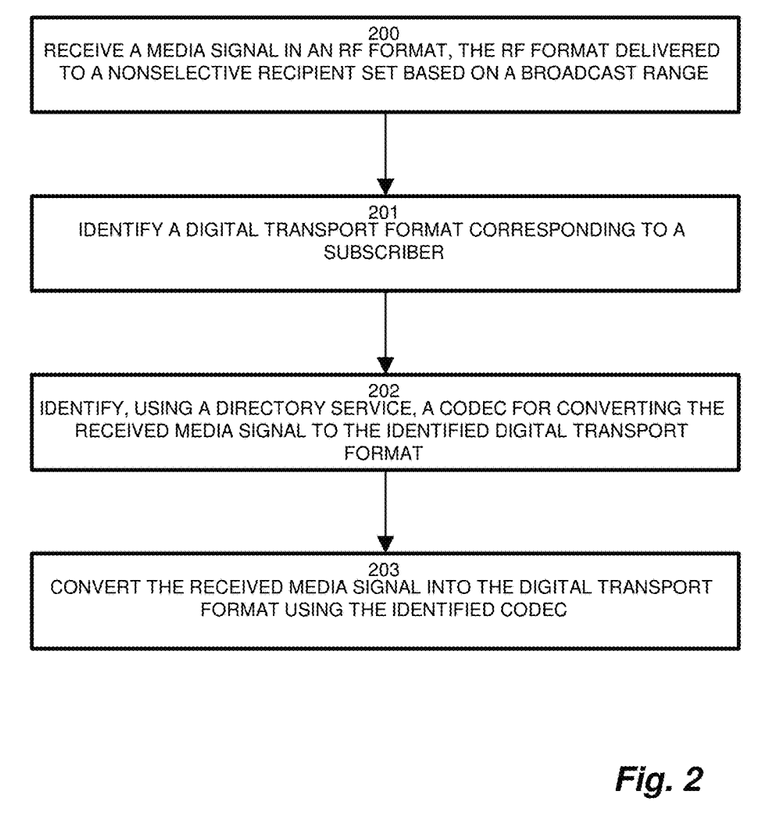
FIG. 2 is a flowchart of packet conversion in the environment of FIG. 1.

FIG. 2 is a flowchart of packet conversion in the environment of FIG. 1. Referring to FIGS. 1 and 2, at step 200, the method of converting ATSC video signals to DLNA includes receiving the ATSC media signal in an RF format, such that the RF format is delivered to a nonselective recipient set based on a broadcast range. Over the air signals are non-selective as they are receivable by anyone within a particular radius of the broadcast source. There is generally no distinction of recipients, in contrast to a packet switched network such as the Internet, which appends a recipient address to each destination (unicast) or group of recipients (multicast). The converter 150 identifies a digital transport format corresponding to a subscriber, as shown at step 201 based on a DLNA format that the subscriber device 120 is capable of receiving. The DLNA standard encompasses multiple formats to adapt to varying expectations of DLNA compliant rendering devices 120. The converter 150 identifies, using a directory service, a codec for converting the received media signal 154 to the identified DNLA digital transport format corresponding to the rendering device 120, as shown at step 202. A codec is a piece of software or encoding program employed for converting between different transmission formats or protocols. The converter 150 then converts the received media signal 154 into the corresponding digital transport format expected by the rendering device using the identified codec, as depicted at step 203.

In the example arrangement, the ATSC to DLNA converter performs repacketizing of the ATSC broadcast payload, which was originally intended for a plurality of recipients, to a DLNA unicast (single recipient) address. The disclosed approach overcomes the difficulty of receiving the MPEG2 HD video stream and encapsulating it into an HTTP unicast IP stream. The ATSC converter as disclosed herein scans the over the air channels for the Program Specific Information broadcast in the MPEG2 transport stream for each frequency. The ATSC converter then parses all the channel information and publishes the channel specific information into the Content Directory Service (CDS). It also builds a translation map between a video URL in the CDS to the tuning parameters on the PSI stream. When a DLNA renderer or control point accesses the video URL in the CDS, the ATSC Converter's media pump tunes to the specific frequency and MPEG2 program that is mapped to that video URL. It then encapsulates all the MPEG2 content from that tuned stream, encapsulates it into IP unicast and send it to the renderer corresponding to a requesting subscriber.

Typical users are the subscribers 110 to the media service (typically a cable TV provider) who invoke the service from a residence for viewing on one of several rendering devices 120, typically a TV 120-2 but also similarly equipped devices such as laptops 120-1, tablets and smartphones 120-3 which are becoming increasingly common as end user recipient devices for multimedia (audio/video) programming.

Figure 3:
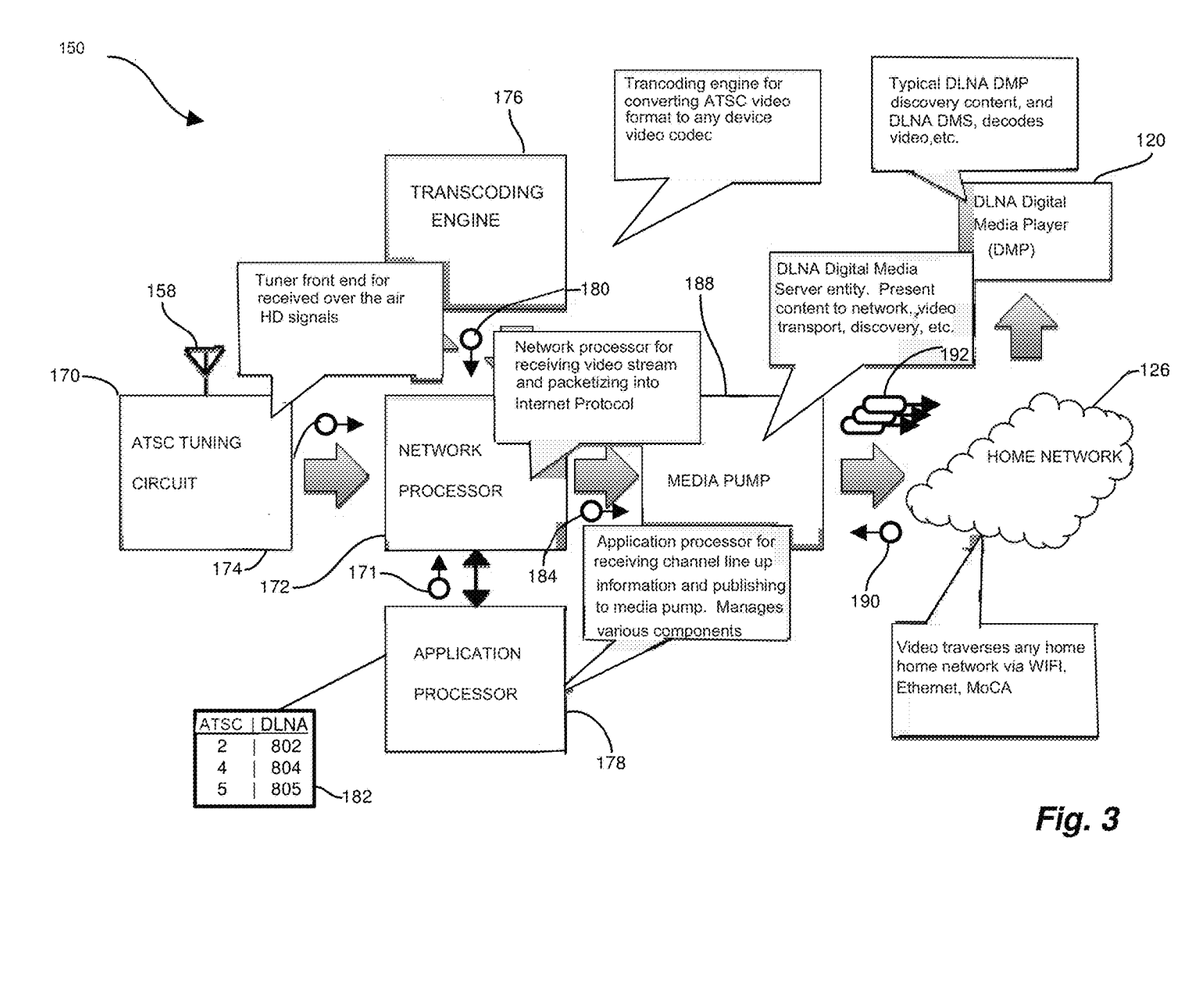
FIG. 3 is a block diagram of packet conversion as in FIG. 2.

FIG. 3 is a block diagram of packet conversion as in FIG. 2. Referring to FIGS. 1-3, in the example arrangement including an ATSC to DLNA signal conversion capability, the packet converter 150 includes an antenna 158 and an ATSC tuning circuit 170 for receipt and demodulation of the broadcast signals 154. A network processor 172 receives the demodulated signal 174 for repacketizing as unicast signals addressed to a rendering device 120 via a corresponding settop box 140. In a typical environment 100, each settop box 140 or similarly enabled destination device is defined by a network identifier including an IP address and a MAC address, however other network protocols may employ alternate network identifiers. A transcoding engine 176 identifies a codec 180 corresponding to the rendering device 120 and provides the codec 180 to the network processor 172 for converting the packets from the demodulated broadcast form to the unicast (recipient addressed) IP form and rendering device 120, described in further detail below in FIG. 4.

An application processor 178 receives a channel lineup indicative of the assignment of channels to media content, typically assigning each channel 144 for carrying a particular media stream 122 including the requested content (service). Accordingly, the application processor 178 maintains a mapping 182 of ATSC to DLNA channels for identifying a channel 142 on which the rendering device 120 may receive the repacketized signal 184. A request 190 from the subscriber 110 identifies the device 120 and requested content so that a media pump 188 can encapsulate the repacketized signal 184 into a delivery stream 192 addressed to the individual rendering device 120 corresponding to the subscriber on a particular channel as assigned by the network processor 172.

Figure 4:
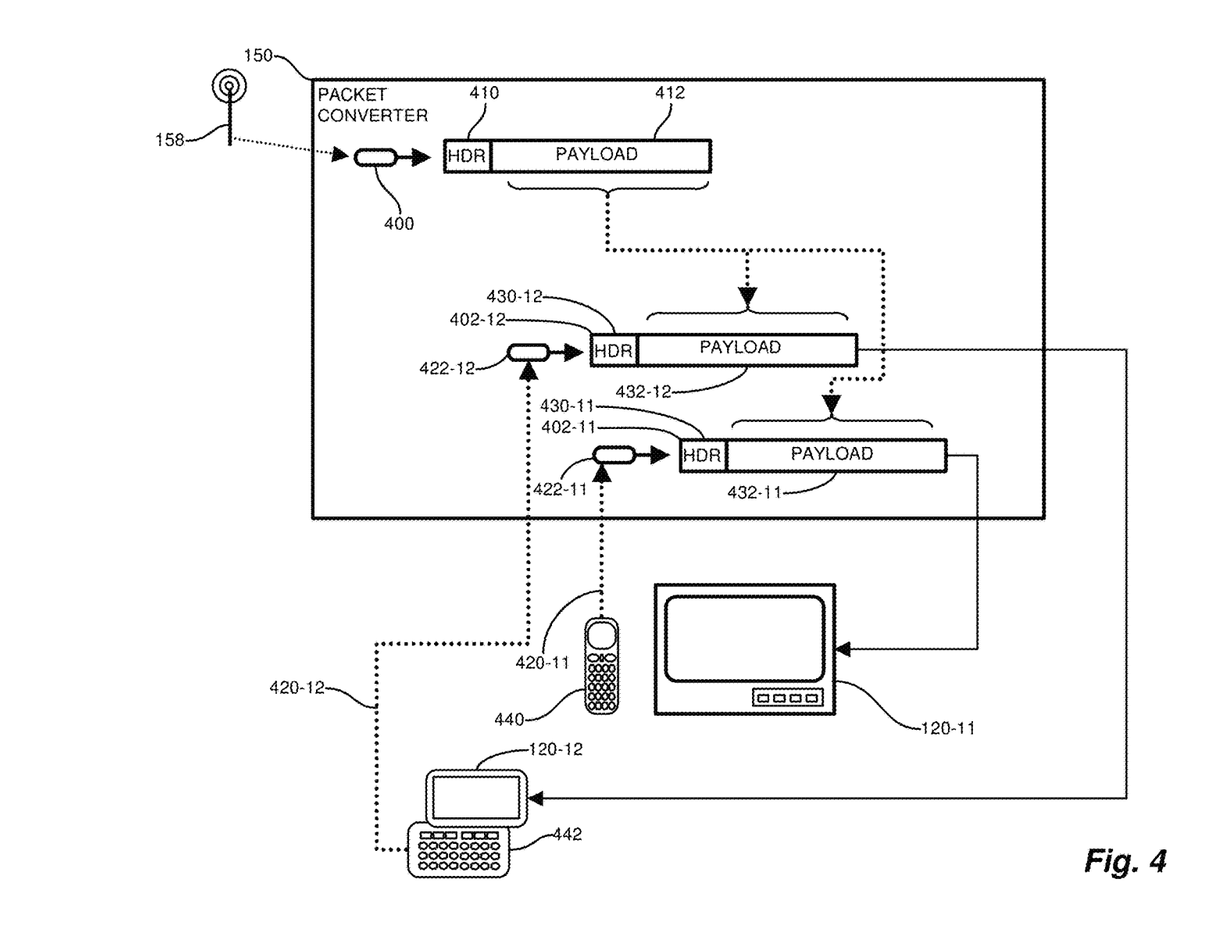
FIG. 4 shows a mapping of converted packets of FIG. 3 to requesting users.

FIG. 4 shows a mapping of converted packets of FIG. 3 to requesting users. Referring to FIGS. 1, 3 and 4, the packet converter 150 receives a series, or stream, of ATSC packets 400 from the antenna 158, representing the broadcast ATSC signal 154. Each packet includes a header 410 and a payload 412. The payload 412 includes the encoded digital media that the rendering device 120 is responsive to, and the header 410 includes metadata and other information about the content and format of the payload, as is typical in packet based systems. The rendering devices 120-11, 120-12 are responsive to DLNA packets 402-11 and 402-12, and as is typical with packet switched networks, employs a recipient designation as a destination for the packet. In IP networks, a network identifier in the header uniquely identifies the rendering device 120; alternatively, a group of recipients may be specified if a multicast encapsulation is employed, but a discrete network identifier nonetheless is employed as representative of the group . . . > In the example arrangement, the ATSC converter implements the Media Server function from DLNA. The content from over the air channels are presented through a standard Content Directory Service (CDS). As an example, in a particular arrangement, the root of the CDS contains:

ATSC Converter Device, Root Level CDS Example Structure:

```
"<DIDL-Lite xmlns="urn:schemas-upnp-org:metadata-1-0/DIDL-Lite/"
xmlns:dc="http://purl.org/dc/elements/1.1/"
xmlns:upnp="urn:schemas-upnp-
org:metadata-1-0/upnp/">
<container id="/0/DbHandler/video" parentID="0" restricted="1"
childCount="1"
searchable="0">
<dc:title>ATSC Channels</dc:title>
</DIDL-Lite>"
```

ATSC Converter Device, Channel Children Example Structure:

```
DIDL-Lite xmlns="urn:schemas-upnp-org:metadata-1-0/DIDL-Lite/"
xmlns:dc="http://purl.org/dc/elements/1.1/"
xmlns:upnp="urn:schemas-upnp-
org:metadata-1-0/upnp/">
<Channel id="/0/DbHandler/video " parentID="/0/DbHandler/video"
restricted="1"
childCount="1" searchable="0">
<ChannelName>KWGN 2</ ChannelName >
<ChannelLogoURI>http://www.stationindex.com/tv/images/cw.gif</
ChannelLogoURI
>
<ChannelCity> Denver, CO</ ChannelCity >
<ChannelNumber>2</channel>
<ChannelOwner>Tribune</ ChannelOwner >
<websiteURL> kwgn.com </websiteURL>
<stationInfo> Digital Full-Power - 1000 kW</stationInfo>
<subchannels> 2.1 KWGN/CW </ subchannels >
<upnp:class>object.container.storageFolder</upnp:class>
<upnp:storageUsed>-1</upnp:storageUsed>
</Channel>
</DIDL-Lite> "
```

ATSC Converter Device, Channel Item CDS Example Structure:

```
<DIDL-Lite xmlns="urn:schemas-upnp-org:metadata-1-0/DIDL-Lite/"
xmlns:dc="http://purl.org/dc/elements/1.1/" xmlns:upnp="urn:schemas-upnp-
org:metadata-1-0/upnp/">
<item id="pts0001#P20" refID="" parentID="20" restricted="1"xdc:title> KWGN
2</dc:title><res protocolInfo="http-
get:*:video/mpeg:DLNA.ORG_PN=MPEG_PS_NTSC">http://192.168.0.11:9000/pts/
KWGN2.mpg?channel=6</res><upnp:class>object.item.videoItem.pts</upnp:classx/it
emx/DIDL-Lite>
```

Accordingly, users 110 issue requests 420-11, 420-12 (420 generally) for programming content that includes a network identity 422-11, 422-12 (422 generally) for inclusion in the header 430-11, 430-12 (430 generally) of the DLNA packet 402. The user 110 generates the request using any suitable interface and device, such as a remote 440 or keypad 442 of a mobile rendering device 120-12. The converter 150 copies the payload 412 representing the substantive media to the DLNA payload 432-11, 432-12 for transmitting each of the DLNA packets 402-11, 402-12 addressed to the respective rendering devices 120-11, 120-12 via the home network area 130'.

Figure 5:
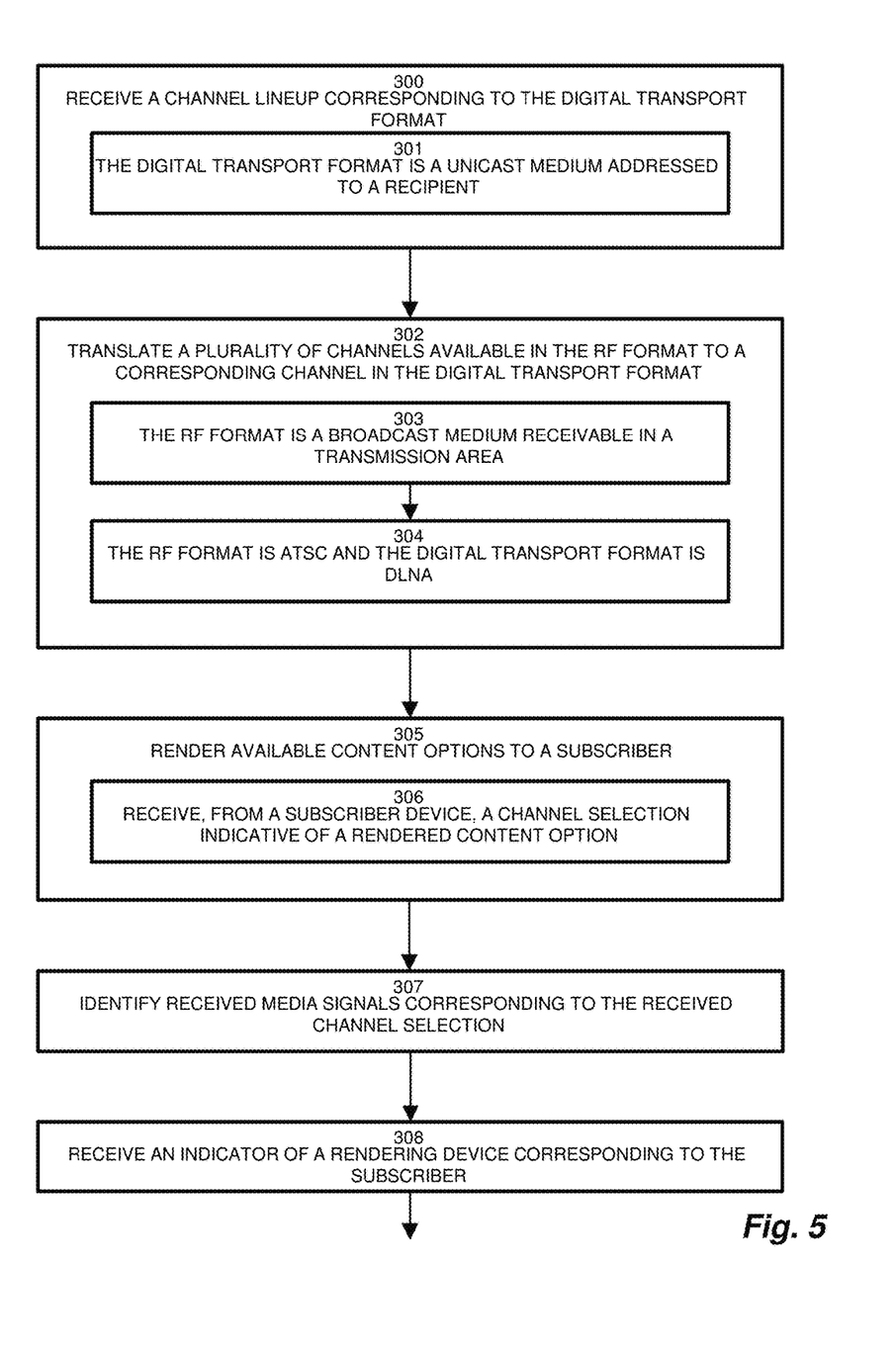
FIGS. 5-7 are a flowchart of delivery of requested media services to users as in FIG. 4.
Figure 6:
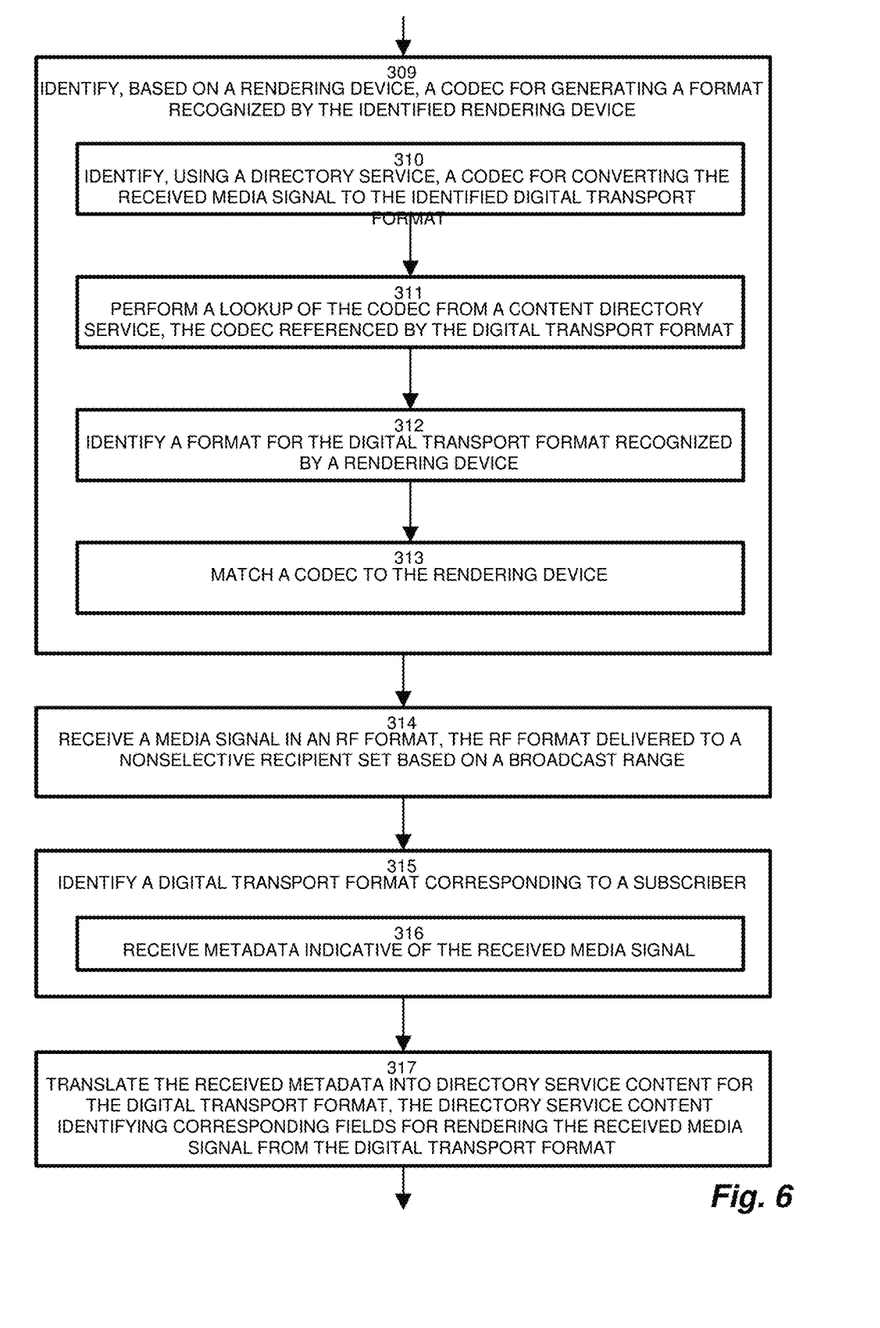
Figure 7:
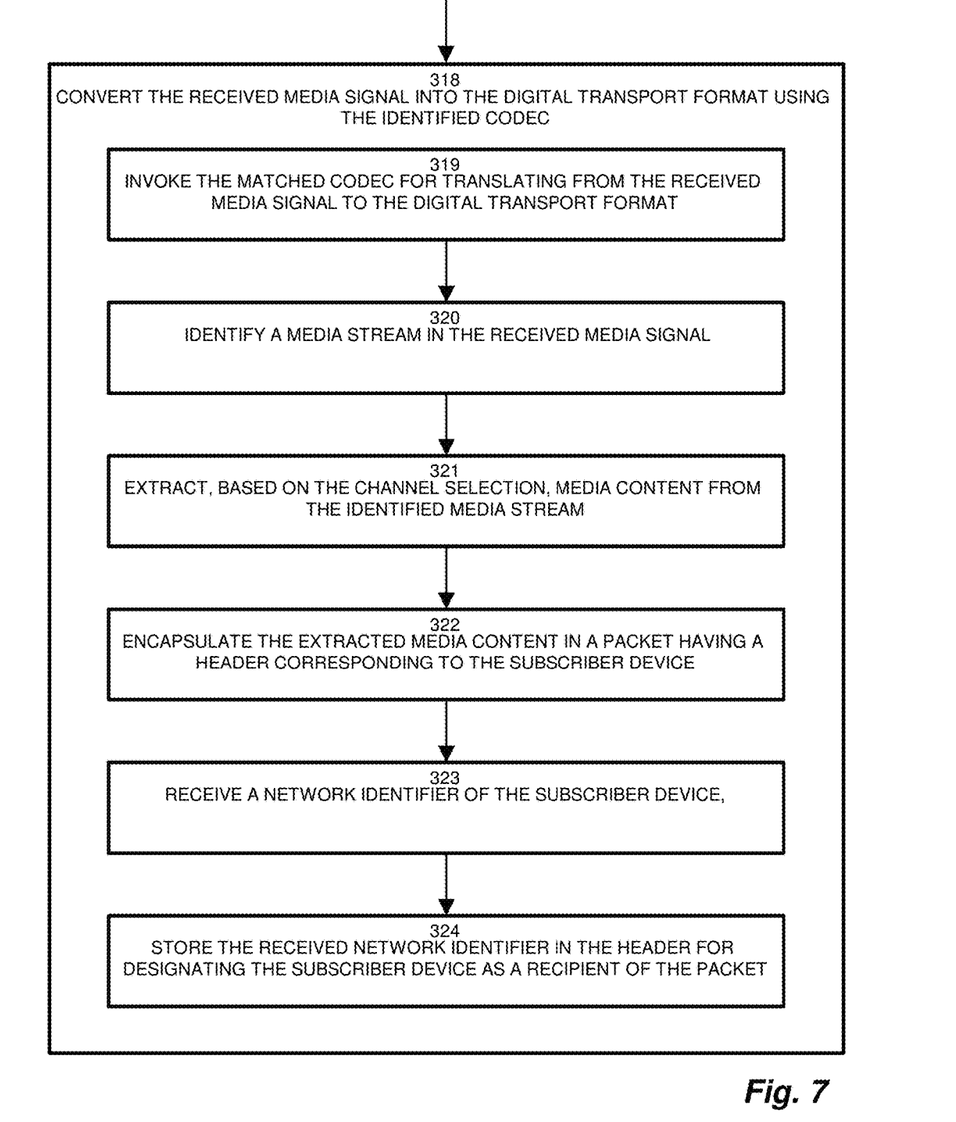

FIGS. 5-7 are a flowchart of delivery of requested media services to users as in FIG. 4. Referring to FIGS. 1 and 3-7, at step 300, the converter 150 receives a channel lineup corresponding to the digital transport format. In the examples herein, the digital transport format is a unicast medium addressed to a recipient, typically a rendering device 120, as shown at step 301. The converter 150 translates a plurality of channels available in the RF format to a corresponding channel 144 in the digital transport format, as depicted at step 302 and shown in the channel mapping 182. A requested ATSC content offering needs to be mapped to a channel receivable by the rendering device 120. The RF format is a broadcast medium receivable in a transmission area by any devices conversant in the broadcast medium, such as an ATSC tuning circuit 170, as shown at step 303. In the examples herein, the RF format is ATSC and the digital transport format is DLNA, as depicted at step 304, however alternate transport mediums may be employed.

The device 120 renders available content options to a subscriber, as depicted at step 305, typically through device 120 interaction on a GUI (graphical user interface) that lists available offerings. The converter 150 receives, from the subscriber device 150, a channel selection indicative of a rendered content option, as shown at step 306, and the converter 150 identifies received media signals 154 corresponding to the received channel selection 420 requested by the user, as shown at step 307. The request 420 also includes an indicator 422 of a rendering device 120 corresponding to the subscriber 110, as shown in step 308 and discussed in FIG. 4.

Upon receipt of the user selection 420, the converter 150 identifies, using a directory service, a codec 180 for converting the received media signal to the identified digital transport format, as depicted at step 309. This includes, at step 310, identifying, based on the rendering device 120, a codec for 180 generating a format recognized by the identified rendering device 120, and performing a lookup of the codec from a content directory service, such that the codec is referenced by the digital transport format (i.e. DLNA) for decoding the media content, as depicted at step 311. The interoperability of DLNA suggests that codecs for conversion between various media formats are available and identifiable via identification of the DLNA conversant devices. Accordingly, the converter 150 identifies a format for the digital transport format recognized by a rendering device, as shown at step 312, and matches a codec 180 to the rendering device 120 for invoking the codec 180 to convert the ATSC signal (i.e. payload) to a payload recognized by the user's rendering device 120, as disclosed at step 313.

Having identified the proper codec, the converter 150 is equipped to begin processing the requested media stream. Accordingly, the converter 150 receives a media signal 154 in an RF format, such that the RF format is delivered to a nonselective recipient set based on a broadcast range, thus being interceptable by any ATSC tuning circuits 170 within range tuned to a corresponding frequency, as depicted at step 314. The converter 150 identifies the digital transport format corresponding to a subscriber 110, as disclosed at step 315, as determined during codec 180 identification above. This includes receiving metadata indicative of the received media signal 154, as shown at step 316. The converter 150 translates the received metadata into directory service content for the digital transport format, such that the directory service content identifies corresponding fields for rendering the received media signal from the digital transport format, as depicted at step 317.

The converter 150 then converts the received media signal 154 into the digital transport format 184 using the identified codec 180, as depicted at step 318. This includes invoking the matched codec 180 for translating from the received media signal to the digital transport format, as depicted at step 319, and identifying a media stream in the received media signal 154. As the transmissions 152 from the ATSC transmitter include multiple streams on channels separated by frequencies, the subscriber request 420 is used to identify the particular media stream carrying the requested content, as shown at step 320. The converter extracts, based on the channel selection, media content from the identified media stream, as shown at step 321, and encapsulates the extracted media content 412 in a packet 402 having a header 430 corresponding to the subscriber device 120, as disclosed in step 322 and shown in FIG. 4. The converter 150 receives a network identifier 422 of the subscriber device 120, as shown at step 323, stores the received network identifier 422 in the header 430 for designating the subscriber device 120 as a recipient of the packet, as depicted at step 324.

The configuration discussed above employs a scenario depicting a receiving subscriber further comprising a home network 150', such that the home network may include a plurality of subscribers for receiving the identified digital transport format, each subscriber of the plurality of subscribers conversant in a common protocol (DLNA). Alternate arrangements of the local home network may be provided.

It will be appreciated by those skilled in the art that alternate configurations of the disclosed invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable storage medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting, the full scope rather being conveyed by the amended claims.

What is claimed is:

1. A method of transporting video signals, comprising:
receiving a media signal in a radio frequency (RF) format, the RF format media signal delivered over the air to a nonselective recipient set of subscribers and non-subscribers based on a broadcast range with no distinction of recipients;
identifying a digital transport format corresponding to a subscriber in the nonselective recipient set of subscribers and non-subscribers based on a Digital Living Network Alliance (DLNA) format that a rendering device of the subscriber is capable of receiving;
identifying, using a directory service, a codec for converting the received media signal to the identified digital transport format expected by the rendering device;
receiving metadata indicative of the received media signal;
translating the received metadata into a content directory service (CDS) for the digital transport format, the content directory service identifying corresponding fields for rendering the received media signal from the digital transport format; and
converting the received media signal into the digital transport format using the identified codec.

2. The method of claim 1 further comprising:
scanning over the air channels for a Program Specific Information (PSI) broadcast an MPEG2 transport stream corresponding to each scanned frequency;
parsing channel information and publishes the channel specific information indicative of the scanned frequency into the directory service.

3. The method of claim 1 wherein converting further comprises:
building a translation map between a video Uniform Resource Locator (URL) from the directory service to the tuning parameters on the PSI stream;
accessing the mapped video URL from the content directory service for directing the received media signal to a requesting subscriber; and
tuning to the specific frequency based on the scanned frequency corresponding to the requested received media signal and an MPEG2 program that is mapped to that video URL.

4. The method of claim 1 further comprising:
receiving an indicator of the rendering device corresponding to the subscriber;
identifying, based on the rendering device, a codec for generating a format recognized by the identified rendering device; and
performing a lookup of the codec from a content directory service, the codec referenced by the digital transport format.

5. The method of claim 1 further comprising:
identifying a format for the digital transport format recognized by the rendering device;
matching a codec to the rendering device; and
invoking the matched codec for translating from the received media signal to the digital transport format.

6. The method of claim 1 further comprising:
receiving a channel lineup corresponding to the digital transport format; and
translating a plurality of channels available in the RF format to a corresponding channel in the digital transport format.

7. The method of claim 6 further comprising:
rendering available content options to a subscriber;
receiving, from the subscriber device, a channel selection indicative of a rendered content option; and
identifying received media signals corresponding to the received channel selection.

8. The method of claim 7 further comprising:
identifying a media stream in the received media signal;
extracting, based on the channel selection, media content from the identified media stream; and
encapsulating the extracted media content in a packet having a header corresponding to the subscriber device.

9. The method of claim 8 further comprising:
receiving a network identifier of the subscriber device, and
storing the received network identifier in the header for designating the subscriber device as a recipient of the packet.

10. The method of claim 6 wherein the RF format is a broadcast medium receivable in a transmission area.

11. The method of claim 10 wherein the digital transport format is a unicast medium addressed to a recipient.

12. The method of claim 11 wherein the RF format is Advanced Television Systems Committee (ATSC) and the digital transport format is Digital Living Network Alliance (DLNA).

13. The method of claim 1 wherein receiving subscriber further comprises a home network, the home network including a plurality of subscribers for receiving the identified digital transport format, each subscriber of the plurality of subscribers conversant in a common protocol.

14. An Advanced Television Systems Committee (ATSC) to Digital Living Network Alliance (DLNA) converter, comprising:
a tuning circuit configured to receive a media signal in a radio frequency (RF) format, the RF format media signal delivered over the air to a nonselective recipient set based on a broadcast range with no distinction of recipients;
a processor for identifying a digital transport format corresponding to a subscriber in the nonselective recipient set of subscribers and non-subscribers based on a Digital Living Network Alliance (DLNA) format that a rendering device of the subscriber is capable of receiving;
an interface to a directory service for identifying, using the directory service, a codec for converting the received media signal to the identified digital transport format;
a transcoding engine for converting the received media signal into the digital transport format expected by the rendering device using the identified codec; and
a network processor configured to receive metadata indicative of the received media signal and translate the received metadata into a content directory service (CDS) for the digital transport format, the content directory service identifying corresponding fields for rendering the received media signal from the digital transport format.

15. The converter of claim 14 comprising:
an RF scanner for scanning over the air channels for a Program Specific Information (PSI) broadcast an MPEG2 transport stream corresponding to each scanned frequency; and
an application processor for parsing channel information and publishing the channel specific information indicative of the scanned frequency into the directory service.

16. The converter of claim 15 further comprising:
a translation map for mapping between a video Uniform Resource Locator (URL) from the directory service to the tuning parameters on the PSI stream; and
a media pump configured to access the mapped video URL from the delivery service for directing the received media signal to a requesting subscriber,
the tuning circuit responsive to the application processor for tuning to the specific frequency based on the scanned frequency corresponding to the requested received media signal and an MPEG2 program that is mapped to that video URL.

17. The converter of claim 14 further comprising
an interface to a subscriber for receiving an indicator of the rendering device corresponding to the subscriber, the directory service interface further configured to:
identify, based on the rendering device, a codec for generating a format recognized by the identified rendering device; and
perform a lookup of the codec from a content directory service, the codec referenced by the digital transport format.

18. A computer program product stored on a non-transitory computer readable storage medium for performing a method of transporting video signals, the method comprising:
receiving a media signal in a radio frequency (RF) format, the RF format media signal delivered on the air to a nonselective recipient set based on a broadcast range with no distinction of recipients;
identifying a digital transport format corresponding to a subscriber in the nonselective recipient set of subscribers and non-subscribers based on a Digital Living Network Alliance (DLNA) format that a rendering device of the subscriber is capable of receiving;
scanning over the air channels for a Program Specific Information (PSI) broadcast an MPEG2 transport stream corresponding to each scanned frequency;
parsing channel information and publishes the channel specific information indicative of the scanned frequency into the directory service;
identifying, using a directory service, a codec for converting the received media signal to the identified digital transport format expected by the rendering device;
receiving metadata indicative of the received media signal;
translating the received metadata into directory service content for the digital transport format, the directory service content identifying corresponding fields for rendering the received media signal from the digital transport format;
converting the received media signal into the digital transport format using the identified codec; and
rendering at least one of the MPEG2 transport streams to a requesting subscriber.

19. The method of claim 1 further comprising:
determining a codec responsive to a digital transport format based on the rendering device, the rendering device recognizing signals converted by the codec from translation of the received RF signal, the received RF signal including Advanced Television Systems Committee (ATSC) signals and the codec for generating Digital Living Network Alliance (DLNA) signals.

20. The method of claim 19 wherein:
the broadcast signals are ATSC signals; and
the interoperability protocol is DLNA.

* * * * *